(12) United States Patent
Gao et al.

(10) Patent No.: US 11,275,518 B2
(45) Date of Patent: Mar. 15, 2022

(54) SYSTEM AND METHOD FOR IMPLEMENTING HETEROGENEOUS MEDIA TYPES WITH RAID

(71) Applicant: EMC IP Holding Company, LLC, Hopkinton, MA (US)

(72) Inventors: Jian Gao, Beijing (CN); Shuyu Lee, Acton, MA (US); Geng Han, Beijing (CN); Xinlei Xu, Beijing (CN); Hongpo Gao, Beijing (CN); Jibing Dong, Beijing (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 42 days.

(21) Appl. No.: 16/671,528

(22) Filed: Nov. 1, 2019

(65) Prior Publication Data
US 2021/0132833 A1    May 6, 2021

(51) Int. Cl.
*G06F 3/06* (2006.01)
(52) U.S. Cl.
CPC ............ *G06F 3/0638* (2013.01); *G06F 3/064* (2013.01); *G06F 3/0604* (2013.01); *G06F 3/0644* (2013.01); *G06F 3/0659* (2013.01); *G06F 3/0689* (2013.01)
(58) Field of Classification Search
CPC .... G06F 3/0638; G06F 3/0689; G06F 3/0659; G06F 3/0604; G06F 12/0284; G06F 12/0615; G06F 12/0646; G06F 2212/1044; G06F 3/0608; G06F 3/0607; G06F 3/0688; G06F 3/0631; G06F 3/064; G06F 3/0611; G06F 3/0629; G06F 3/0647; G06F 3/067; G06F 3/0644; G06F 9/5016; G06F 9/5083
See application file for complete search history.

(56) References Cited

U.S. PATENT DOCUMENTS

| | | | | |
|---|---|---|---|---|
| 5,546,558 | A * | 8/1996 | Jacobson | G06F 11/1076 711/114 |
| 7,836,271 | B1 * | 11/2010 | Dalal | G06F 3/0689 711/170 |
| 2014/0258612 | A1 * | 9/2014 | Kalwitz | G06F 11/2087 711/114 |
| 2018/0324438 | A1 * | 11/2018 | Kwak | H04N 19/86 |
| 2019/0034087 | A1 * | 1/2019 | Renauld | G06F 11/1464 |

* cited by examiner

*Primary Examiner* — Reginald G Bragdon
*Assistant Examiner* — Curtis James Kortman
(74) *Attorney, Agent, or Firm* — Brian J. Colandreo; Mark H. Whittenberger; Holland & Knight LLP

(57) ABSTRACT

A method, computer program product, and computer system for receiving, by a computing device, a request to create a heterogeneous storage object. A first storage object of the heterogeneous storage object may be created with a first RAID type. A second storage object of the heterogeneous storage object may be created with a second RAID type. The heterogeneous storage object may be persisted to a data store.

17 Claims, 6 Drawing Sheets

SYSTEM AND METHOD FOR IMPLEMENTING HETEROGENEOUS MEDIA TYPES WITH RAID

BACKGROUND

Some storage systems may not support heterogeneous storage management. For example, some RAID resilience sets (RRS) may be bounded to a unique device type. As such, some storage objects may only be composed of drive slices from a single device type, which may not be efficient.

BRIEF SUMMARY OF DISCLOSURE

In one example implementation, a method, performed by one or more computing devices, may include but is not limited to receiving, by a computing device, a request to create a heterogeneous storage object. A first storage object of the heterogeneous storage object may be created with a first RAID type. A second storage object of the heterogeneous storage object may be created with a second RAID type. The heterogeneous storage object may be persisted to a data store.

One or more of the following example features may be included. An IO request may be received. It may be determined whether the IO request is for the heterogeneous storage object. Determining whether the IO request is for the heterogeneous storage object may include identifying a field in the heterogeneous storage object indicating a type of the storage object. The IO request may be sent to be processed at a first media drive type when the IO request is for the heterogeneous storage object. The IO request may be sent to be processed at a second media drive type when the IO request is not for the heterogeneous storage object. The first media drive type may be a higher performance drive than the second media drive type.

In another example implementation, a computing system may include one or more processors and one or more memories configured to perform operations that may include but are not limited to receiving, by a computing device, a request to create a heterogeneous storage object. A first storage object of the heterogeneous storage object may be created with a first RAID type. A second storage object of the heterogeneous storage object may be created with a second RAID type. The heterogeneous storage object may be persisted to a data store.

One or more of the following example features may be included. An IO request may be received. It may be determined whether the IO request is for the heterogeneous storage object. Determining whether the IO request is for the heterogeneous storage object may include identifying a field in the heterogeneous storage object indicating a type of the storage object. The IO request may be sent to be processed at a first media drive type when the IO request is for the heterogeneous storage object. The IO request may be sent to be processed at a second media drive type when the IO request is not for the heterogeneous storage object. The first media drive type may be a higher performance drive than the second media drive type.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing device, a request to create a heterogeneous storage object. A first storage object of the heterogeneous storage object may be created with a first RAID type. A second storage object of the heterogeneous storage object may be created with a second RAID type. The heterogeneous storage object may be persisted to a data store.

One or more of the following example features may be included. An IO request may be received. It may be determined whether the IO request is for the heterogeneous storage object. Determining whether the IO request is for the heterogeneous storage object may include identifying a field in the heterogeneous storage object indicating a type of the storage object. The IO request may be sent to be processed at a first media drive type when the IO request is for the heterogeneous storage object. The IO request may be sent to be processed at a second media drive type when the IO request is not for the heterogeneous storage object. The first media drive type may be a higher performance drive than the second media drive type.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
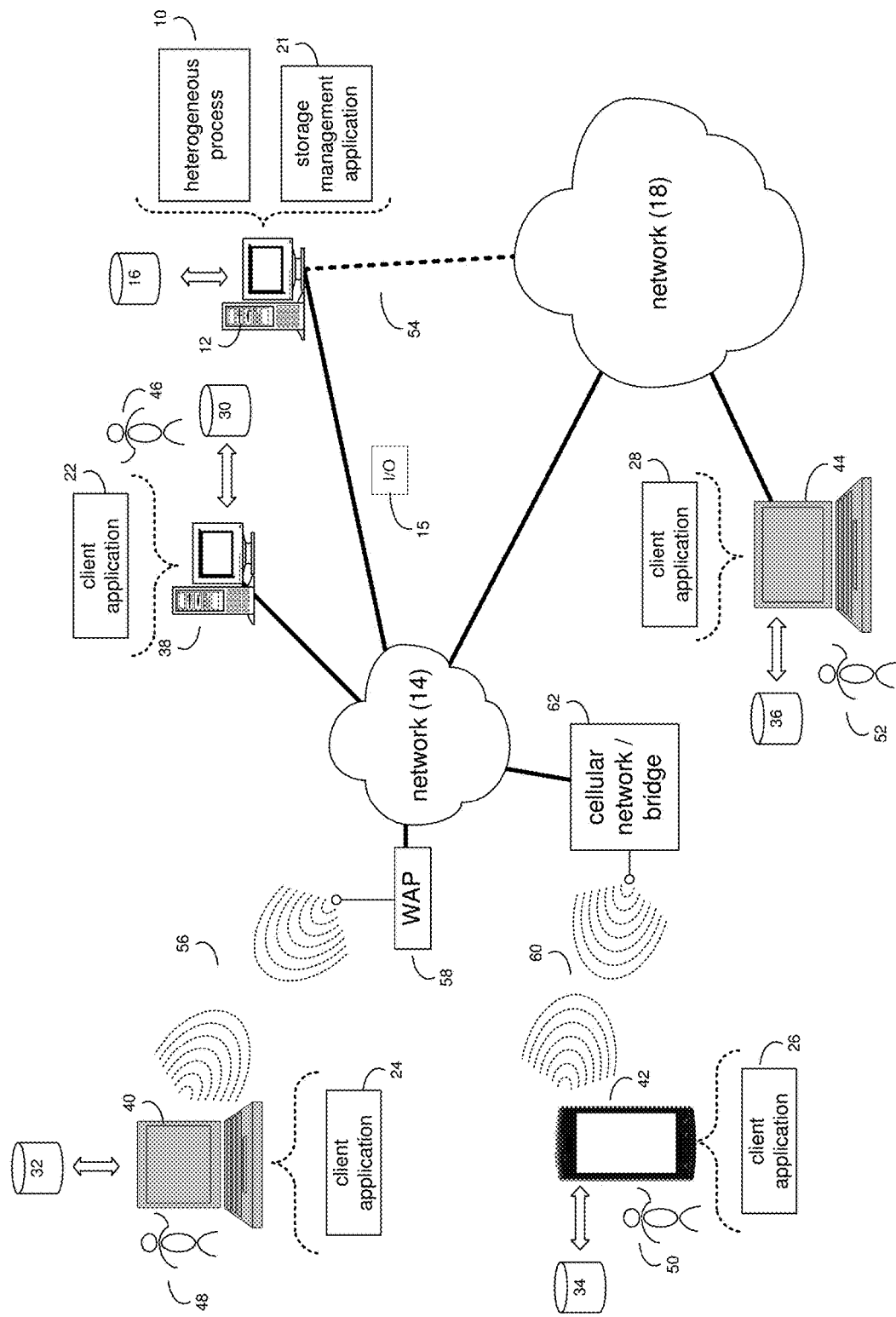
FIG. 1 is an example diagrammatic view of a heterogeneous process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown heterogeneous process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a heterogeneous process, such as heterogeneous process 10 of FIG. 1, may receive, by a computing device, a request to create a heterogeneous storage object. A first storage object of the heterogeneous storage object may be created with a first RAID type. A second storage object of the heterogeneous storage object may be created with a second RAID type. The heterogeneous storage object may be persisted to a data store.

In some implementations, the instruction sets and subroutines of heterogeneous process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, heterogeneous process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, heterogeneous process 10 and/or storage management application 21 may be accessed via one or more of client applications 22, 24, 26, 28. In some implementations, heterogeneous process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within heterogeneous process 10, a component of heterogeneous process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of heterogeneous process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM).

Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of heterogeneous process 10 (and vice versa). Accordingly, in some implementations, heterogeneous process 10 may be a purely server-side application, a purely client-side application, or a hybrid server-side/client-side application that is cooperatively executed by one or more of client applications 22, 24, 26, 28 and/or heterogeneous process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, heterogeneous process 10, and storage management application 21, taken singly or in any combination, may effectuate some or all of the same functionality, any description of effectuating such functionality via one or more of client applications 22, 24, 26, 28, heterogeneous process 10, storage management application 21, or combination thereof, and any described interaction(s) between one or more of client applications 22, 24, 26, 28, heterogeneous process 10, storage management application 21, or combination thereof to effectuate such functionality, should be taken as an example only and not to limit the scope of the disclosure.

In some implementations, one or more of users 46, 48, 50, 52 may access computer 12 and heterogeneous process 10 (e.g., using one or more of client electronic devices 38, 40, 42, 44) directly through network 14 or through secondary network 18. Further, computer 12 may be connected to network 14 through secondary network 18, as illustrated with phantom link line 54. Heterogeneous process 10 may include one or more user interfaces, such as browsers and textual or graphical user interfaces, through which users 46, 48, 50, 52 may access heterogeneous process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
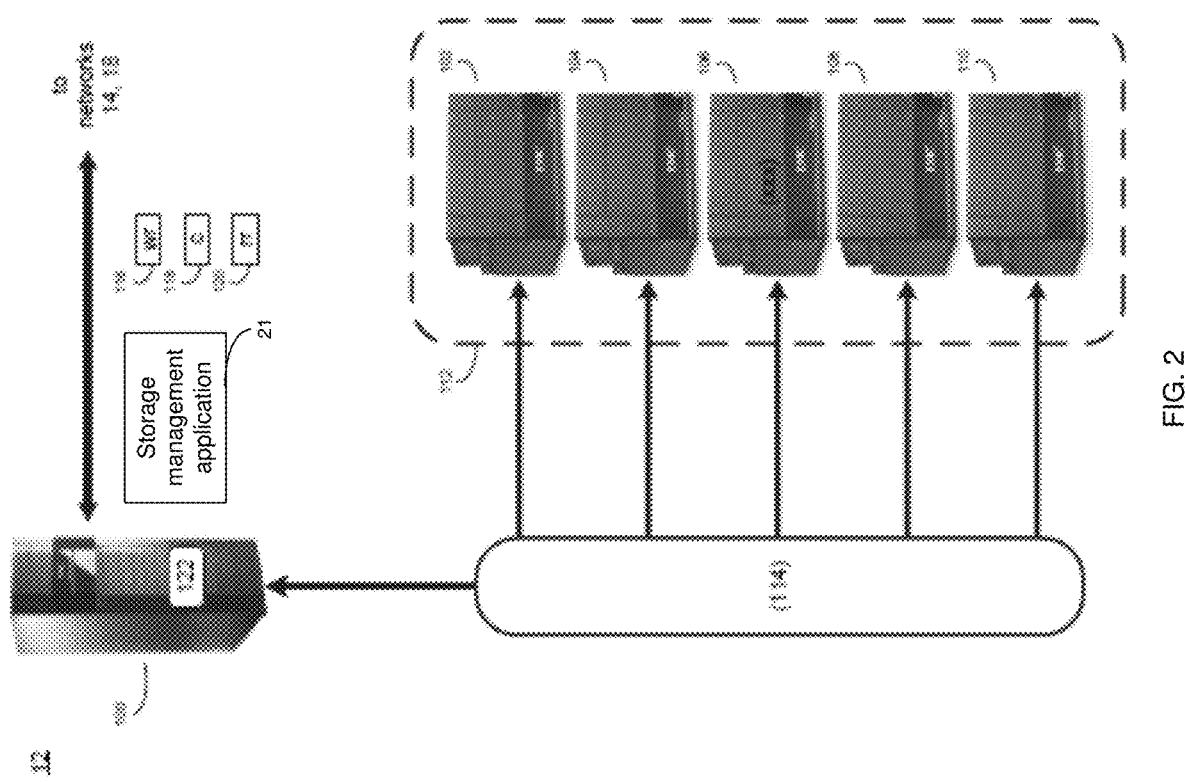
FIG. 2 is an example diagrammatic view of a storage system of FIG. 1 according to one or more example implementations of the disclosure.
Figure 3:
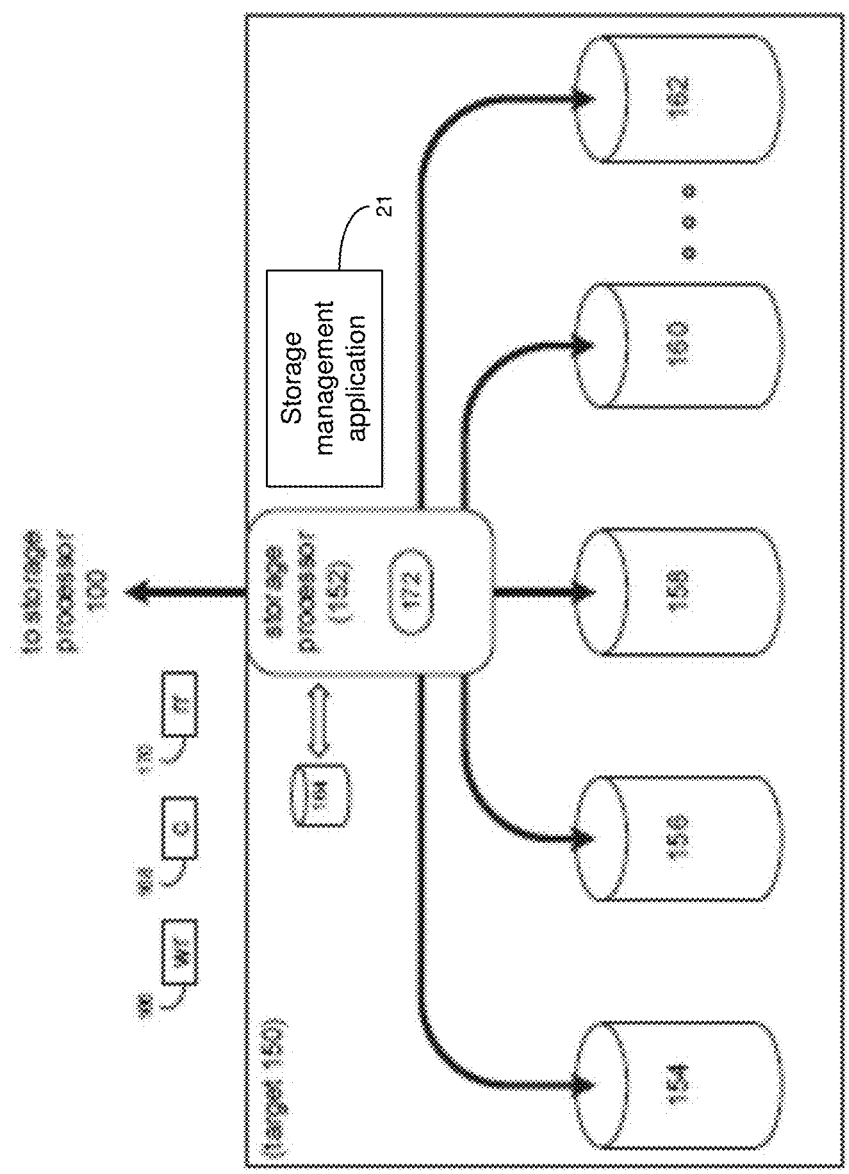
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or heterogeneous process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™ VNX™ or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Figure 4:
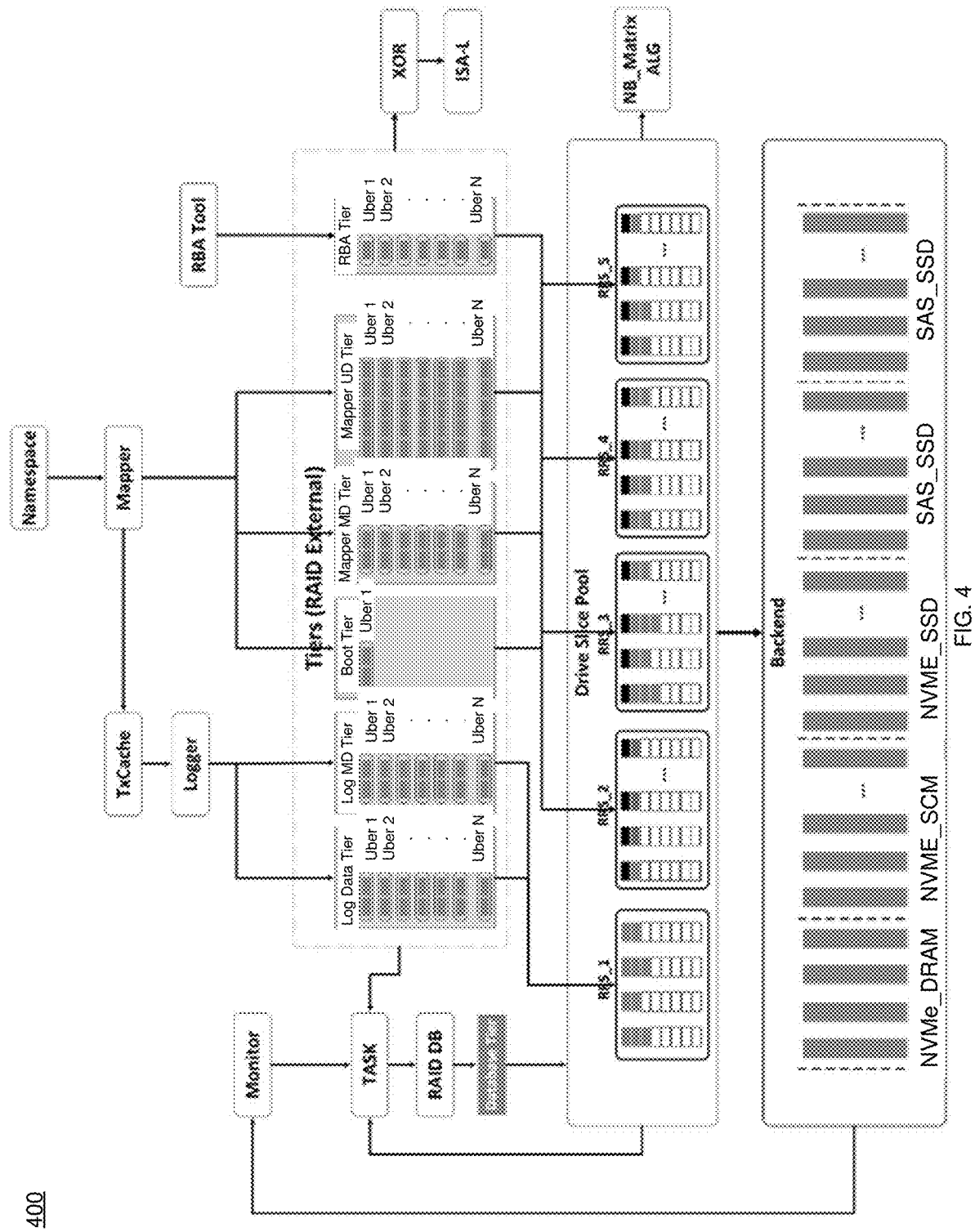
FIG. 4 is an example diagrammatic view of a storage system environment according to one or more example implementations of the disclosure.

As noted above, some storage systems may not support heterogeneous storage management. For example, some RAID resilience sets (RRS) may be bounded to a unique device type. As such, some storage objects may only be composed of drive slices from a single device type, which may not be efficient. For example, and referring at least to the example FIG. 4, an example storage system environment 400 is shown. In the example, the storage system environment is a Trident RAID architecture; however, it will be appreciated that various and similar other types of RAID architectures may be used without departing from the scope of the present disclosure.

As shown in storage system environment 400, there may be drives (e.g., Mt_Carmel as persistent media for write Cache, ColdStream—SCM, CliffDale—NVME_SSD, TLC—SAS_SSD, etc.), RAID resilence sets (RRS) (e.g., the physical fault domain, one RRS is specifically bounded to one device type), drive slices (e.g., one segment drive capacity, the storage mgmt. unit), Ubers (e.g., a storage object composed by a number of drive slices from one RRS. The number may depend on the Uber RAID width/type, and may be the composing granularity of the tier), and Tiers (e.g., similar to a LUN, it is exposed to Mapper and other consumers, which may provide capacity and IO processing capability to the consumer. It may be composed by a number of Ubers, and the number may depend on the required capacity and Uber size).

Generally, one RRS may be bounded to a unique device type, and one Uber may only come from a single RRS, and the Uber may be the Tier composing granularity. As such, in the example version of storage system environment 400, one tier may only consume one device type, so the Uber may only be composed by the drive slices from one device type. That is, there is no mixed device type Uber requirement. In the case of one drive failing, the drive slice pool may be responsible for doing sparing (e.g., choosing optimal drive slices from other drives in the same RRS, so the spared in the drive slice keeps the same device type as other live drive slices in the Uber, to replace failing ones), and may also need to conform to other rules. Then, the rebuild may be handled by RAID (e.g., driven by Mapper) at the Uber granularity level, and the sparing may also be handled at the Uber granularity as well. The RAID reliability may be significantly impacted by the RRS size and the rebuild rate. Per the reliability model of the example version of storage system environment 400, with the same device type in one RRS, and with an achievable rebuild rate target, the RRS size maximum may be, e.g., 25 drives. Notably, the reliability model may have the assumption of the RRS (physical fault domain) being composed by the same device type, so the devices in one RRS may expose a very similar attributes (e.g., fault rate, IO handling capability, worn out speed (write per day), etc.).

Therefore, as will be discussed in greater detail below, the present disclosure may enable implementing heterogeneous media type RAID Ubers. This may result in increased performance from faster media, and result in obtaining data protected (redundancy) from slower media. Other example and non-limiting technical advantages of the present disclosure may include, e.g., keeping the RRS specific to a media type, which may simplify the RAID reliability model (e.g., no need to introduce any reliability regression based on the older reliability model), no need to design new rebuild, restripe, rebalance, etc. RAID background services for this heterogeneous Uber, and keeping the spare management the same (e.g., no need to define new spare management policy and mechanism for heterogeneous Uber as those RAID background services may be either transparent to the heterogeneous Uber or just a combination of existing processing), extendibility to parity heterogeneous Uber or multi-ways heterogeneous Uber with each way with different RAID type and width, while maintaining software stability and quality all while using the same or similar RAID architecture and designs currently used should that be beneficial.

Figure 5:
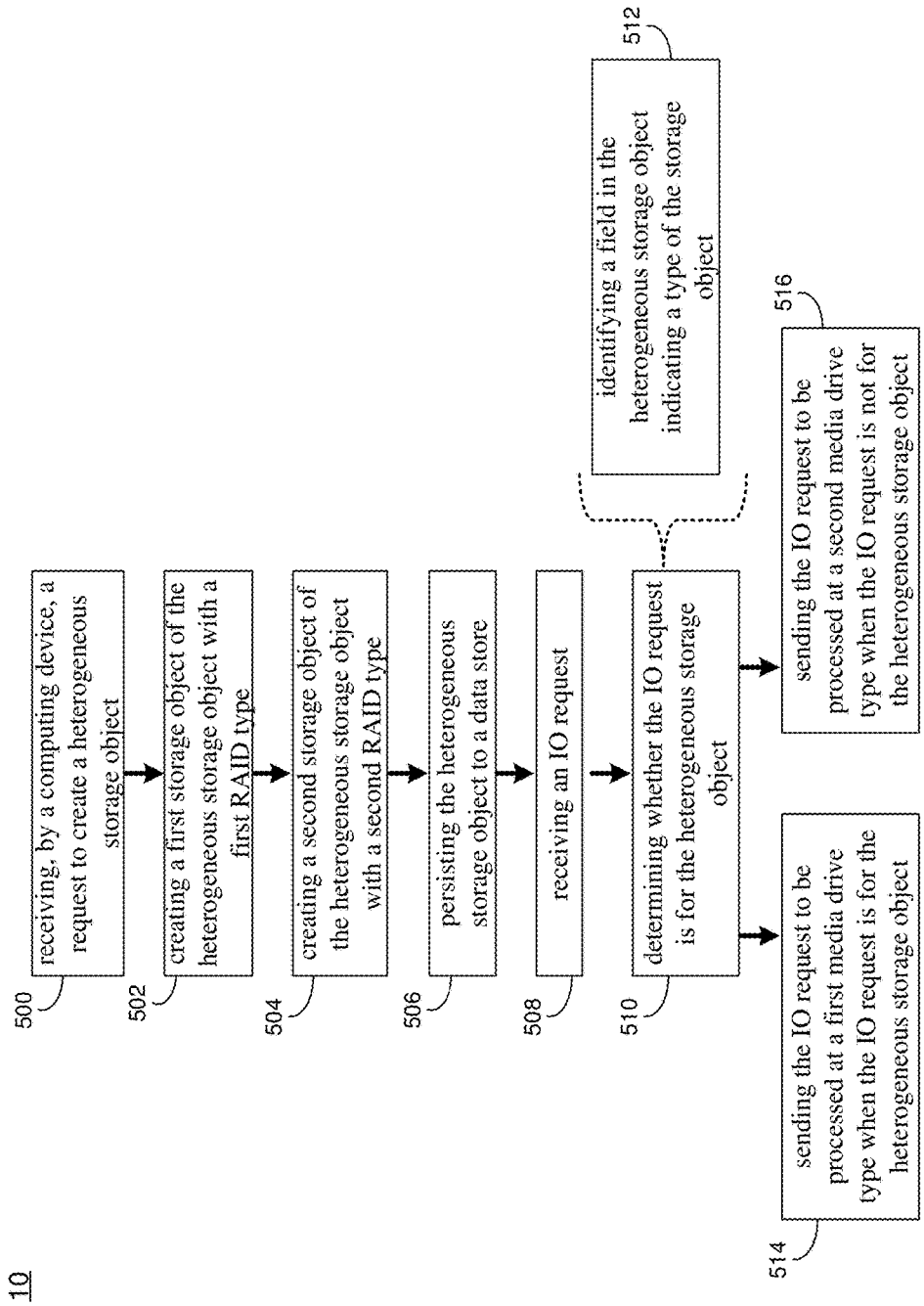
FIG. 5 is an example flowchart of a heterogeneous process according to one or more example implementations of the disclosure.
Figure 6:
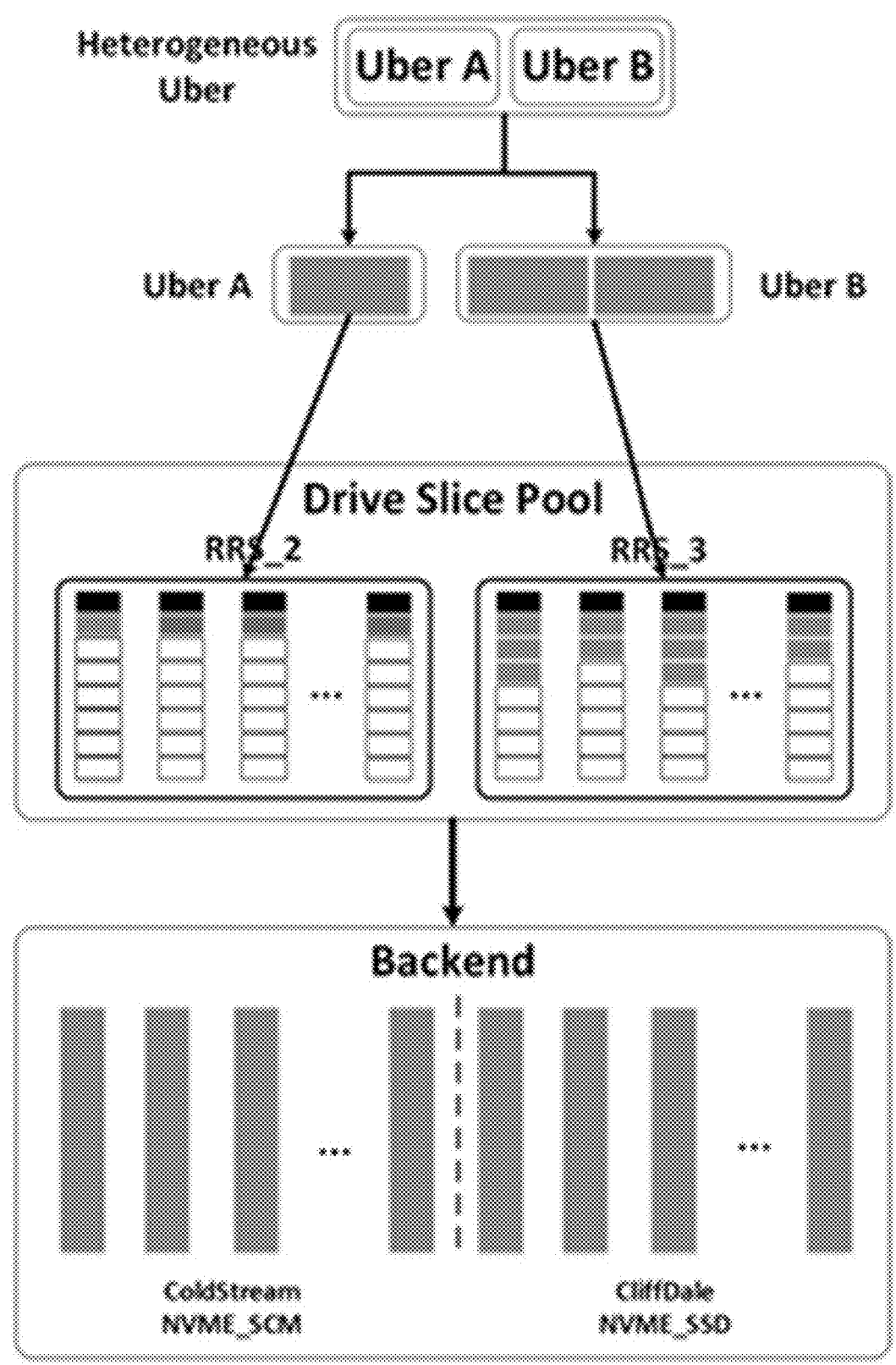
FIG. 6 is an example diagrammatic view of a storage system environment according to one or more example implementations of the disclosure.

The Heterogeneous Process:

As discussed above and referring also at least to the example implementations of FIGS. 5-6, heterogeneous process (HP) 10 may receive 500, by a computing device, a request to create a heterogeneous storage object. HP 10 may create 502 a first storage object of the heterogeneous storage object with a first RAID type. HP 10 may create 504 a second storage object of the heterogeneous storage object with a second RAID type. HP 10 may persist 506 the heterogeneous storage object to a data store.

In some implementations, HP 10 may receive 500, by a computing device, a request to create a heterogeneous storage object. For instance, and referring at least to the example implementation of FIG. 6, an example storage system environment 600 that may be used in any combination with storage system environment 400 is shown. HP 10 may receive 500 a request to create a heterogeneous storage object (e.g., heterogeneous Uber also referred to as an H_Uber).

In some implementations, HP 10 may create 502 a first storage object of the heterogeneous storage object with a first RAID type, and in some implementations, HP 10 may create 504 a second storage object of the heterogeneous storage object with a second RAID type. For example, the H_Uber may need to have the capability of treating one Uber (storage object) with drive slice capability. In some implementations, the drive slice may be identified by, e.g., the drive ID, the logical block address (LBA), and a new Uber ID (e.g., identifies the resource (Uber) put into the H_Uber). When implementing H_Uber allocation, HP 10 may request that the drive slice pool expose two Ubers to it (e.g., the first Uber created 502 from, for instance, SCM device type R0 Uber and the second Uber created 504 from, for instance, the SSD device type two ways R1 Uber). It will be appreciated that other device types, storage objects, as well as RAID types may be used without departing from the scope of the present disclosure.

In some implementations, HP 10 may create 502 a first uber with raid type storage device (e.g., disk), meaning only one disk slice is used to compose the RAID Uber A. HP 10 (e.g., via a RAID component) may select one disk slice from the disk pool by the specific disk slice selection algorithm (that makes sure the disk consumption is even). After selecting the disk slice, RAID (e.g., via HP 10) may generate the Uber ID (UberA_ID) which has not been used by an existing Uber, and sets the Uber attribute, such that the Uber is composed with disk slice, e.g., [0x1, 0xf], that means the disk slice comes from disk ID 0x1, the 15$^{th}$ slices, and the Uber type is a normal Uber. Next, RAID (e.g., via HP 10) may create the second Uber which may indicate the RAID type is RAID 1. HP 10 may select two disk slices from the disk pool with the disk slice selection algorithm. After selecting the disk slices, RAID (e.g., via HP 10) may generate the Uber ID (UberB_ID) for this Uber, and set the Uber attribute, such as, e.g., position 0—[0x3, 0x5], position 1—[0x6, 0x7], and set the Uber type as a normal Uber. That indicates where the disk slice comes from. After both Ubers are created, HP 10 may create the H-Uber with them. HP 10 may set the H-Uber type as a Heterogeneous Uber, and its downstream position, e.g., 0—[UberA_ID, 0x0], position 1—[UberB_ID, 0x0]. That means the H-Uber's downstream are normal Ubers.

In some implementations, HP 10 may record the two Uber IDs into its Uber Information (discussed below). When creating the H_Uber, HP 10 may create two sub requests to create two kinds of sub-Ubers, and obtain their respective Uber IDs. HP 10 may send two separate requests to create 502/504 each Uber with parameter of how the sub Ubers should be created. For example, when creating a normal Uber, HP 10 may provide the parameters of, e.g., RAID type and Uber type, then HP 10 (e.g., via the RAID Component) knows how many disk slices are required to selected from the slice pool. HP 10 may create the Uber with the selected disk slices. When creating the H-Uber, HP 10 may provide the RAID component with the Uber ID array. Such as, e.g., [1$^{st}$ Uber ID, 2$^{nd}$ Uber ID, etc.] and the Uber type. With these Parameters, RAID knows an H-Uber should be created with the sub-Uber IDs.

In some implementations, HP 10 may persist 506 the heterogeneous storage object to a data store. For example, after receiving the two Uber IDs from the sub requests, HP 10 may create the H_Uber with the two Uber IDs. HP 10 may then persist 506 the configuration to the RAID DB. As such, when creating a H_Uber, HP 10 may receive the request to create the H_Uber, send a request to create one of the Ubers with, e.g., a RAID 0 type, return an Uber ID (e.g., Uber ID A), send another request to create the other Uber with, e.g., a RAID 1 type, return the Uber ID (e.g., Uber ID B), create the H_Uber with the Uber ID A and Uber ID B, and persist the changed value to the RAID data store.

In some implementations, the Uber may need to have included in its information an Uber type, which may inform HP 10 that the downstream object under this Uber is an Uber A type device or an Uber B type device. So, in addition to the above information of the drive ID and the LBA, Uber data may contain at least some of the following fields/values: Uber ID (e.g., the Uber ID which identifies the Uber), Uber Type (e.g., heterogeneous Uber or normal Uber), sub Uber ID/device ID [raid_width] (e.g., the sub Uber IDs or device IDs), and drive type [raid_width] (e.g., defines the drive type according to the drive performance). It will be appreciated that more or less fields, as well as other fields, may be included.

In some implementations, HP 10 may define the drive type for each Uber downstream position. The drive type may reflect the drive performance, which may be leveraged to optimize the read performance. For instance, assume for example purposes only that HP 10 may receive 508 an IO request. In the example, only a single two way R1 geometry calculation may be needed follow by another R1 or R0 IO processing. When I/O comes to the H_Uber, HP 10 does not necessarily need to take care of the downstream ID, Uber ID or device ID. It just sends the request down.

HP 10 may process the read I/O in a different way than a normal R1 Uber, which may optimize the read performance with the higher performance drive. For example, in some implementations, HP 10 may determine 510 whether the IO request is for the heterogeneous storage object (e.g., H_Uber), where determining whether the IO request is for the heterogeneous storage object may include identifying 512 a field in the heterogeneous storage object indicating a type of the storage object. For instance, when the I/O is received by HP 10, HP 10 may identify the value in the Uber type field to determine the Uber type associated with the request. As noted above, the Uber type identifies whether the Uber is an H_Uber or a normal Uber.

In some implementations, HP 10 may send 514 the IO request to be processed at a first media drive type when the IO request is for the heterogeneous storage object, and HP 10 may send 516 the IO request to be processed at a second media drive type when the IO request is not for the heterogeneous storage object, where the first media drive type (e.g., SCM device type) may be a higher performance drive than the second media drive type (e.g., SSD device type). For instance, in some implementations, if the Uber is identified as an H_Uber, HP 10 may send the IO request to the sub Uber, which is created with a higher performance drive than the drive used to create the normal Uber. In this way, the read performance may greatly improve. Conversely, if the Uber is not identified as an H_Uber, HP 10 may send the IO request to be processed normally.

Regarding spare/rebuild of the H_Uber, the spare may be mostly handled by HP 10 (e.g., via the drive slice pool at the Uber level), rather than at the H_Uber level. The rebuild may be handled by either the H_Uber only or both the Uber and H_Uber together. For instance, there are various example and non-limiting cases shown in the example Table 1 below.

TABLE 1

The Drive Slice State and Heterogeneous Uber State

| Case | SCM Drive Slice | SSD Drive Slice 1 | SSD Drive Slice 2 | Heterogeneous Uber State |
|---|---|---|---|---|
| 1 | Broken | Optimal | Optimal | Degraded |
| 2 | Optimal | Broken | Optimal | Optimal |
| 3 | Optimal | Optimal | Broken | Optimal |
| 4 | Broken | Broken | Optimal | Degraded |
| 5 | Broken | Optimal | Broken | Degraded |
| 6 | Optimal | Broken | Broken | Degraded |
| 7 | Broken | Broken | Broken | Broken |

As can be seen above, Table 1 shows the example and non-limiting use cases of drive slice broken combination and result in the H_Uber state. As an example only, Table 1 shows how the spare may be handled in each case, where Uber A is SCM R0 Uber, Uber B is SSD two ways R1 Uber. Each case will be described below.

Case 1: The Uber A is broken and H_Uber is degraded. The H_Uber (e.g., via HP 10) may send a recovery IOCTL command to the Uber A, and in the R0 Uber broken case, when it receives the recovery IOCTL, R0 Uber may request a new drive slice from the drive slice pool. Then Uber A (e.g., via HP 10) reports to the H_Uber the spare is complete. The H_Uber (e.g., via HP 10) may perform R1 rebuild, from Uber B to recovered Uber A.

Cases 2 and 3: The Uber B is degraded but H_Uber is optimal, in this case, only the Uber (e.g., via HP 10) performs the spare and rebuild, without any involvement from the H_Uber.

Cases 4 and 5: This is the sum of Case 1 and Case 2, so the handling may also require both processing from Case 1 and Case 2.

Case 6: The Uber B is broken, the H_Uber (e.g., via HP 10) sends the recovery IOCTL to the Uber B. Then, the Uber B (e.g., via HP 10) requests two optimal drive slices from the drive slice pool. HP 10 may notify the H_Uber that the recovery of the Uber B is complete, where H_Uber (e.g., via HP 10) may perform the rebuild from the Uber A to recovered the Uber B. The two ways R1 broken Uber recovery (or re-fill both drive slices) may be supported for the Logger Tiers, and may be extended to the Mapper MD Tier and/or all two ways R1 Tiers.

Case 7: The H_Uber is broken, HP 10 may send the recovery IOCTL to both the Uber A and the Uber B. Once both Ubers are recovered, HP 10 may notify the consumer of H_Uber to do the recovery.

Regarding restriping, rebalancing, expansion, and RRS splits, all of the Uber A, the Uber B and the H_Uber may be in an optimal status. All of their handling may be done on the Uber A and the Uber B level by the drive slice pool (e.g., via HP 10) as is done currently. Thus, the processing may be fully transparent to the H_Uber, which may be implemented with little alternation of current systems.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, by a computing device, a request to create a heterogeneous storage object;
   creating a first storage object with a first redundant array of independent disks (RAID) type, wherein the first storage object is defined as a normal storage object type based on a location of a first disk slice used to compose the first storage object, wherein creating the first storage object includes:
      generating, for the first storage object, a first identifier corresponding to the first disk slice used to compose the first storage object;
   creating a second storage object with a second RAID type, wherein the second storage object is defined as a normal storage object type based on a location of a second disk slice used to compose the second storage object, wherein creating the second storage object includes:
    generating, for the second storage object, a second identifier corresponding to the second disk slice used to compose the second storage object;
creating the heterogeneous storage object with the first storage object and the second storage object, wherein creating the heterogeneous storage object with the first storage object and the second storage object includes:
    obtaining, from the first storage object, the first identifier corresponding to the first disk slice used to compose the first storage object;
    obtaining, from the second storage object, the second identifier corresponding to the second disk slice used to compose the second storage object; and
    determining, from the first identifier corresponding to the first disk slice used to compose the first storage object and the second identifier corresponding to the second disk slice used to compose the second storage object, a number of disk slices required to be selected from a disk slice pool to create the heterogeneous storage object; and
persisting the heterogeneous storage object to a RAID data store.

2. The computer-implemented method of claim 1 further comprising receiving an IO request.

3. The computer-implemented method of claim 2 further comprising determining whether the IO request is for the heterogeneous storage object.

4. The computer-implemented method of claim 3 further comprising sending the IO request to be processed at a first media drive type when the IO request is for the heterogeneous storage object.

5. The computer-implemented method of claim 4 further comprising sending the IO request to be processed at a second media drive type when the IO request is not for the heterogeneous storage object.

6. The computer-implemented method of claim 5 wherein the first media drive type is a higher performance drive than the second media drive type.

7. A computer program product residing on a non-transitory computer readable storage medium having a plurality of instructions stored thereon which, when executed across one or more processors, causes at least a portion of the one or more processors to perform operations comprising:
    receiving a request to create a heterogeneous storage object;
    creating a first storage object with a first redundant array of independent disks (RAID) type, wherein the first storage object is defined as a normal storage object type based on a location of a first disk slice used to compose the first storage object, wherein creating the first storage object includes:
        generating, for the first storage object, a first identifier corresponding to the first disk slice used to compose the first storage object;
    creating a second storage object with a second RAID type, wherein the second storage object is defined as a normal storage object type based on a location of a second disk slice used to compose the second storage object, wherein creating the second storage object includes:
        generating, for the second storage object, a second identifier corresponding to the second disk slice used to compose the second storage object;
    creating the heterogeneous storage object with the first storage object and the second storage object, wherein creating the heterogeneous storage object with the first storage object and the second storage object includes:
        obtaining, from the first storage object, the first identifier corresponding to the first disk slice used to compose the first storage object;
        obtaining, from the second storage object, the second identifier corresponding to the second disk slice used to compose the second storage object; and
        determining, from the first identifier corresponding to the first disk slice used to compose the first storage object and the second identifier corresponding to the second disk slice used to compose the second storage object, a number of disk slices required to be selected from a disk slice pool to create the heterogeneous storage object; and
    persisting the heterogeneous storage object to a RAID data store.

8. The computer program product of claim 7 wherein the operations further comprise receiving an IO request.

9. The computer program product of claim 8 wherein the operations further comprise determining whether the IO request is for the heterogeneous storage object.

10. The computer program product of claim 9 wherein the operations further comprise sending the IO request to be processed at a first media drive type when the IO request is for the heterogeneous storage object.

11. The computer program product of claim 10 wherein the operations further comprise sending the IO request to be processed at a second media drive type when the IO request is not for the heterogeneous storage object.

12. The computer program product of claim 11 wherein the first media drive type is a higher performance drive than the second media drive type.

13. A computing system including one or more processors and one or more memories configured to perform operations comprising:
    receiving a request to create a heterogeneous storage object;
    creating a first storage object with a first RAID type, wherein the first storage object is defined as a normal storage object type based on a location of a first disk slice used to compose the first storage object, wherein creating the first storage object includes:
        generating, for the first storage object, a first identifier corresponding to the first disk slice used to compose the first storage object;
    creating a second storage object with a second redundant array of independent disks (RAID) type, wherein the second storage object is defined as a normal storage object type based on a location of a second disk slice used to compose the second storage object, wherein creating the second storage object includes:
        generating, for the second storage object, a second identifier corresponding to the second disk slice used to compose the second storage object;
    creating the heterogeneous storage object with the first storage object and the second storage object, wherein creating the heterogeneous storage object with the first storage object and the second storage object includes:
        obtaining, from the first storage object, the first identifier corresponding to the first disk slice used to compose the first storage object;
        obtaining, from the second storage object, the second identifier corresponding to the second disk slice used to compose the second storage object; and determining, from the first identifier corresponding to the first disk slice used to compose the first storage object and the second identifier corresponding to the second disk slice used to compose the second storage object, a number of disk slices required to be selected from a disk slice pool to create the heterogeneous storage object; and persisting the heterogeneous storage object to a RAID data store.

14. The computing system of claim 13 wherein the operations further comprise receiving an IO request.

15. The computing system of claim 14 wherein the operations further comprise determining whether the IO request is for the heterogeneous storage object.

16. The computing system of claim 15 wherein the operations further comprise sending the IO request to be processed at a first media drive type when the IO request is for the heterogeneous storage object.

17. The computing system of claim 16 wherein the operations further comprise sending the IO request to be processed at a second media drive type when the IO request is not for the heterogeneous storage object, wherein the first media drive type is a higher performance drive than the second media drive type.

* * * * *